Nov. 3, 1942.  E. J. DONDLINGER  2,300,557
VEHICLE SPRING SUSPENSIONS
Filed June 5, 1940  2 Sheets-Sheet 1

Inventor:
Eugene J. Dondlinger
By: [signature]
Attorney

Nov. 3, 1942.  E. J. DONDLINGER  2,300,557
VEHICLE SPRING SUSPENSIONS
Filed June 5, 1940  2 Sheets-Sheet 2
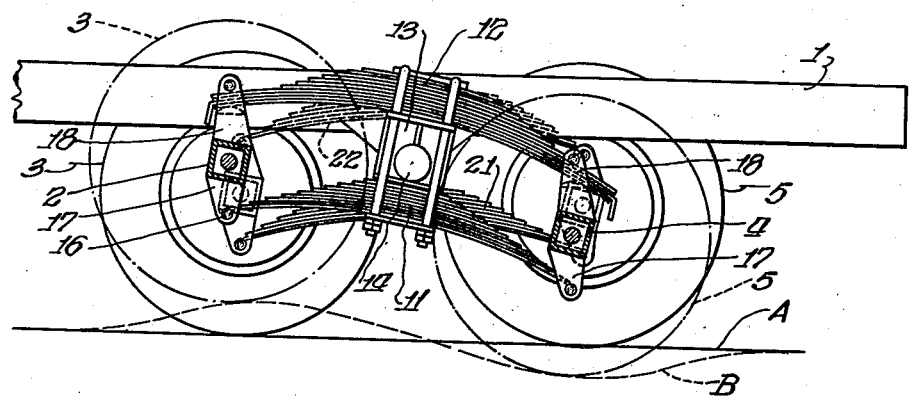
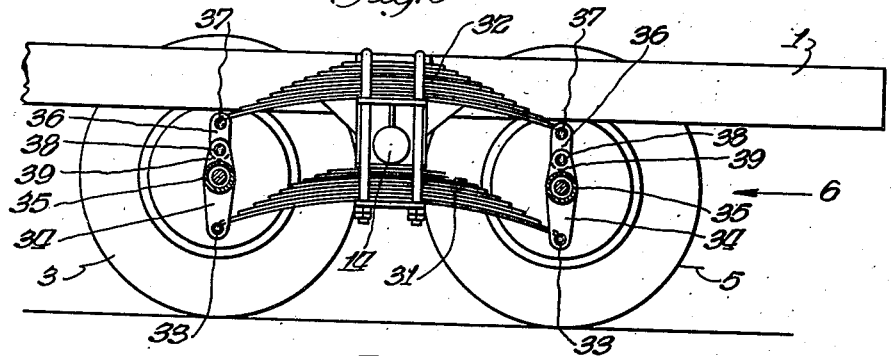
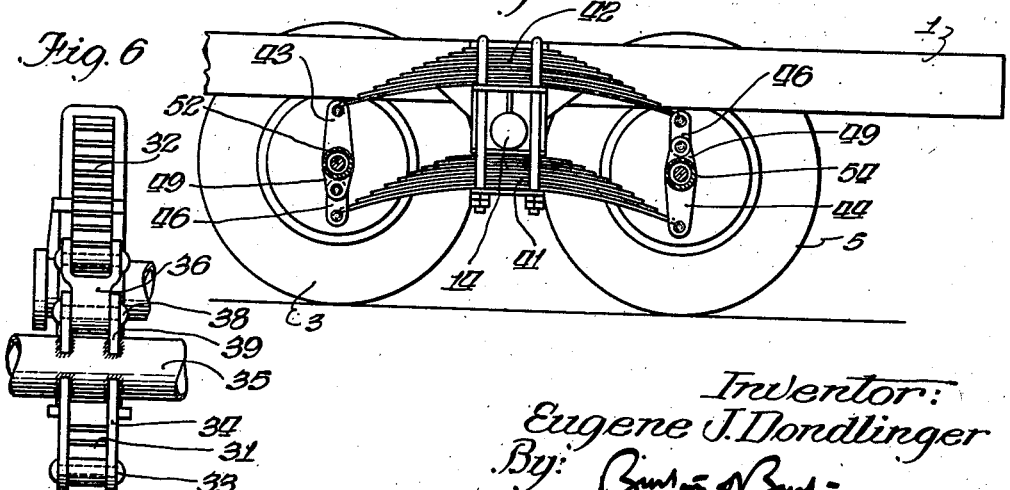
Inventor:
Eugene J. Dondlinger
By: Burton & Burton
Attorney.

Patented Nov. 3, 1942

2,300,557

UNITED STATES PATENT OFFICE 2,300,557

VEHICLE SPRING SUSPENSION

Eugene J. Dondlinger, Chicago, Ill.

Application June 5, 1940, Serial No. 338,975

9 Claims. (Cl. 280—124)

This invention relates to road vehicles of the type in which two load supporting axles are connected together to form a truck provided with springs extending from axle to axle and distributing the load of the frame and body thereto. One object of this invention is to provide a spring suspension of the type indicated and so connected to the axles as to avoid undue torsional stresses therein when opposite sides of the truck stand at different levels or out of parallel relation to each other. Another object of the invention is to provide a relatively simple spring suspension for a vehicle truck having two parallel axles in which the springs are adapted to resist the torque incident to driving and braking while at the same time they are connected to the axles so as to permit them to follow uneven road contour without transmitting excessive twisting strains to the vehicle frame which the truck carries. It is also an object of the invention to provide a vehicle truck of the type indicated in which the springs at one side of the truck are connected to the axles so as to maintain a fixed relation between them and so as to assume most of the torque, while the springs at the opposite side are provided with compensating connections permitting the axles to alter their relation to each other in following irregularities of the road. Other features and advantages will appear as the description proceeds. The invention consists in certain features and elements of construction in combination, as herein shown and described and as indicated by the claims.

In the drawings:

Figure 4 is an elevational view taken similarly to Figure 2, but indicating the relative positions of the parts in following an irregular road surface.

Figure 5 is an elevational view similar to Figure 2, but showing modified construction.

Figure 6 is a fragmentary rear elevation taken looking in the direction of the arrow 6 on Figure 5.

Figure 7 is a view similar to Figure 2, but showing a further modification.

Figure 1:
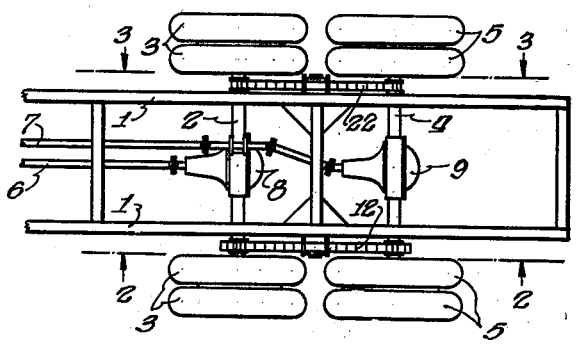
Figure 1 is a partial plan view of a road vehicle chassis adapted to employ a spring suspension embodying this invention.

The spring suspension which is the subject of this invention is illustrated as applied to the driving axles of a motor truck, and Figure 1 indicates a dual drive construction by which power is transmitted to both axles; but it may be understood that the spring suspension itself is also applicable where the load supporting wheel arrangement is similar as in trailer vehicles or at the front end of a heavy duty motor truck where the wheels would be suitably mounted for steering, but not necessarily connected to the power plant for driving purposes. As shown in Figure 1, the vehicle frame includes side members 1, 1 with a forward axle 2 having road wheels 3 and a rear axle 4 having road wheels 5. Figure 1 also indicates propeller drive shafts 6 and 7 extending to differential housings 8 and 9, respectively, through which power is transmitted to the wheels 3 and 5 simultaneously. Therefore, in subsequent views the axles 2 and 4 are indicated as housings enclosing drive shafts for the wheels, but it may be understood that the spring suspension to which this invention is directed might be employed with solid axles such as are commonly used on trailers or as front axles for motor vehicles.

Figure 2:
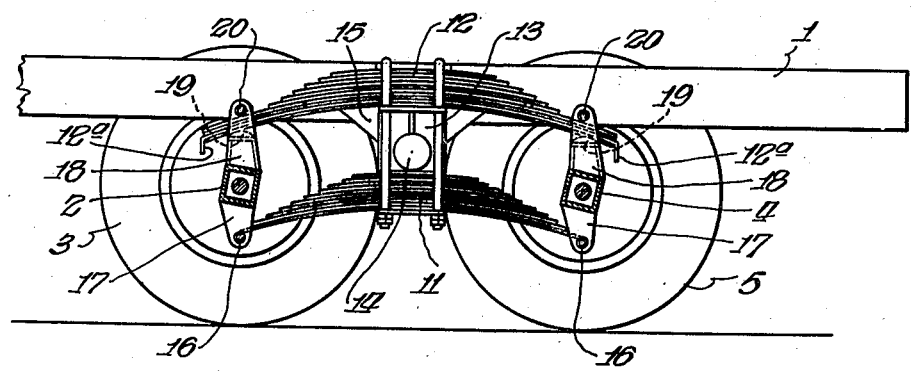
Figure 2 is an elevational view taken as a section as indicated at line 2—2 on Figure 1, and viewing the spring suspension from the left side of the vehicle.

As shown in Figure 2, the axles 2 and 4 are connected at the left side of the frame by means of a lower spring 11 and an upper spring 12 which are clamped to the lower and upper faces, respectively, of a block or casting 13 pivotally connected to the frame member 1, by a trunnion 14 which is attached to the frame member 1, by a suitable means including a bracket plate seen at 15. The middle of each of the springs 11 and 12 is thus securely anchored to the block 13, so that the springs will rock as a unit about the trunnion 14 in response to vertical movements of the wheels 3 and 5 in traveling over irregularities of the road. The spring 11 is secured by pivot bolts 16 to brackets 17 which may be of bifurcated form and which are rigidly secured to the hollow axles 2 and 4 and extend downwardly from them. Rigid bifurcated brackets 18 extend upwardly from the axles, but instead of being pivotally connected to the ends of the spring 12, they are formed with rounded pads 19 on which the end portions of the spring 12 rest and over which they are slidable when the springs deflect in response to variations of load pressure or when the side of the truck rocks about the trunnion 14 as hereinafter more fully explained. The spring 12 may include downwardly bent end portions 12a serving as guards to prevent the springs from escaping endwise from the brackets 18, and the brackets include cross bolts 20 to retain the spring ends in position over the pads 19.

Figure 3:
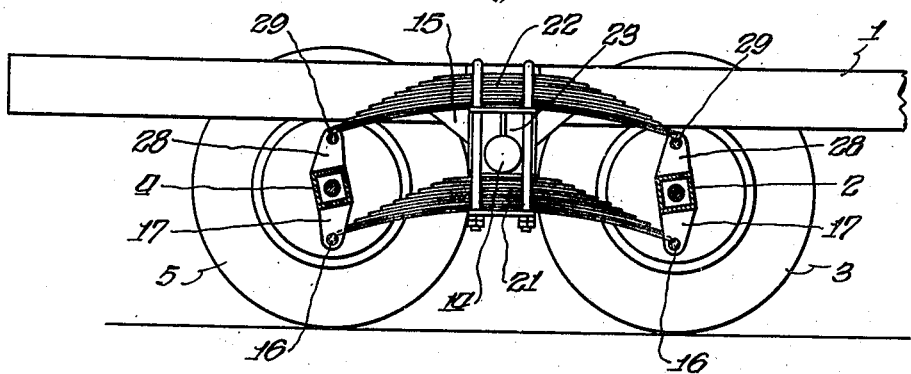
Figure 3 is an elevational view taken as a section as indicated at line 3—3 on Figure 1, and viewing the spring suspension from the right side of the vehicle.

Figure 3 illustrates the spring arrangement at the opposite side of the truck, showing a lower spring 21 and an upper spring 22 secured rigidly to a block 23 which is pivoted on a trunnion 14 similar to that employed on the left side, as already described. The spring 21 is connected with the axles 2 and 4 by pivot bolts 16 secured in brackets 17 depending rigidly from the axles; and the axles are provided with similar upstanding brackets 28, to which the ends of the upper spring 22 are attached by pivot bolts 29. Preferably the springs 21 and 22 are similar in design and dimensions, so that the load is distributed about equally between them.

It may be noted that in the particular design chosen for illustration the hollow axles 2 and 4 are of square cross section and are shown slightly tilted; this tilted position is merely incidental to the inclined position of propeller drive shafts associated with these axles, but for the purpose of simplifying the drawings the representation of the drive shafts and of the differential housings has been omitted from all views except Figure 1. It will be understood that the spring connecting brackets 17, 18 and 28 may be readily designed for application to axles of other cross section and that the tilted position of the square axles illustrated does not affect the operation of the spring suspension.

In Figure 4 it is assumed that the wheels 3 and 5 adjacent the springs 21 and 22—that is, on the right side of the vehicle, are traveling upon a substantially level portion of the road surface indicated by a full line A, while the wheels at the opposite side of the truck are traversing an irregular surface indicated by the broken line B, so that the forward wheel 3 at the left side of the vehicle is considerably elevated, while the rear wheel 5 at the left side is dropped into a depression in the contour B. Therefore, at the left side of the truck, which includes the structure shown in Figure 2, the forward axle 2 is raised and the rear axle 4 is lowered, causing the springs 11 and 12 to assume oblique positions as they rock as a unit about the trunnion 14. If the ends of the axles 2 and 4 were anchored to the springs 11 and 12 by rigid brackets and pivotal connections like those shown in Figure 3, this rocking or rotation of the springs 11 and 12 about the trunnion 14 would tend to produce limited angular rotation of the axles 2 and 4 about the axis of the trunnion 14; or rather since the opposite ends of the axles could not be thus rotated, there would be twisting or torsional strains set up in the axles themselves or transmitted to the springs causing breakage or permanent distortion of the parts. But since the upper spring 12 is only slidably engaged with the brackets 18 at the bearing pads 19, the rocking of the springs 11 and 12 to the position shown in Figure 4 is accomplished without setting up any such torsional strains in the axles 2 and 4. By reason of the pivotal connections at 16 between the lower spring 11 and the bracket arms 17 the portions of the axles 2 and 4 adjacent the springs 11 and 12 are permitted to shift upward and downward from their original positions without rotation. The upper brackets 18 are thus maintained rigidly in positions substantially parallel to their original positions while the rocking movement of the upper spring 12 about the axis of trunnion 14 causes it to slide lengthwise through the brackets 18 as shown in Figure 4.

It will be evident that if the right side of the truck instead of the left side should encounter an uneven road surface, the springs 21 and 22 would rock as a unit about their trunnion bearing 14 and in this case the bracket arms 17 and 28 would be swung with the springs to similar oblique positions out of parallel to their original positions; and this would cause limited angular rotation of the axles 2 and 4 about the trunnion axis. But at the other side of the truck the sliding relation between the ends of the spring 12 and the supporting pads 19 in the brackets 18 would permit these brackets to shift under the spring 12 in response to the slight twisting of the axles 2 and 4, thus avoiding any strain which would otherwise result from this torsional effect. This condition is not illustrated in the drawings since it will be readily understood after an appreciation of Figure 4 and the action which it represents.

Figure 5 illustrates a modified construction designed to accomplish substantially the same results as that already described. In this case it may be assumed that one side of the truck is equipped with springs arranged as shown in Figure 3—that is, with both springs pivotally attached at both ends to brackets rigidly secured to both axles. Then on the opposite side of the truck the lower spring 31 is pivotally connected by spring bolts 33 to bracket arms 34 extending rigidly from both axles 35. The upper spring 32 is equipped at both ends with shackles 36 pivotally attached to the spring ends at 37 and pivotally connected at 38 to bracket arms 39 extending rigidly upward from the axles. Thus, under conditions such as those indicated in Figure 4, the upper spring 32 will be permitted to shift lengthwise with respect to the axles 35 by pivotal movement of its shackles 36 about their connecting pivots 38, and in this way the torsional strains which would otherwise be set up in the axles 35 will be avoided.

Figure 6 illustrates on a larger scale than Figure 5 the arrangement of one of the shackles 36, showing its pivotal connection at 38 to the short bracket arms 39 which are shown welded to the round axle 35 while similarly welded arms 34 extend downwardly for pivotal connection with the spring 31 at 33.

It should be understood that the accommodation afforded by the slidable arrangement of the spring 12 with respect to the axles 2 and 4 or by the pivoted shackles 36 need not be secured entirely at one spring. Figure 7 illustrates an arrangement in which the lower spring 41 is pivoted at one end to a rigid bracket arm 44, while at the opposite end it is connected to a pivoted shackle 46 depending from a short rigid bracket 49 attached to the axle 52. From the upper side of the axle 52 a rigid bracket arm 43 connects with one end of the upper spring 42 while the other axle 54 is fitted at its upper side with a bracket 49 and shackle 46 connected to the other end of the spring 42. Thus, each of the springs is provided with an accommodating connection to one of the axles so as to permit limited torsional movement of either axle as a result of the relative rocking of the two sides of the truck in traversing an uneven rod surface.

With any of the constructions above described it will be evident that when they are applied to driving axles as in a motor truck, the driving torque will be resisted by the pair of springs at one side which are connected pivotally to rigid bracket arms as shown in Figure 3, supplemented by the rigid bracket arms at the opposite ends of the axles. In Figures 2 and 5 these rigid arms are both attached to a lower spring of the pair, and this spring transmits the torque to the vehicle frame along with the two springs 21 and 22 of Figure 3. In Figure 7 one end of the lower spring 41 is available for transmitting torque from the bracket arm 44, and one end of the spring 42 is likewise available in combination with the arm 43. Similarly, in each construction there are three springs ar their equivalent available for carrying the stresses incident to braking, whether the construction be employed on a motor driven vehicle or on a trailer, since trailer vehicles requiring tandem axles of this character will practically always be fitted with brakes.

While there is shown and described herein certain specific structure embodying the invention, it will be manifest to those skilled in the art that various modifications and rearrangements of the parts may be made without departing from the spirit and scope of the invention, and that the same is not limited to the particular form herein shown and described, except in so far as indicated by the appended claims.

I claim as my invention:

1. In a vehicle truck comprising a pair of axles, a vehicle frame, trunnion means on the frame intermediate said axles, and a pair of springs at each side of the frame having their middle portions secured rigidly together, said spring being mounted one above the other on said trunnion means for oscillation together thereon, the ends of both springs at one side of said frame being pivotally attached directly to the axles, and at the other side of the frame the ends of one spring of the pair being pivotally attached directly to the axles, the ends of the other spring engaging the axles with capacity for play in the direction of the length of said spring.

2. In a vehicle truck comprising a pair of axles, a vehicle frame, trunnion means on the frame intermediate said axles, and a pair of springs at each side of the frame mounted one above the other on said trunnion means of oscillation together thereon, the ends of both springs at one side of said frame being pivotally attached directly to the axles, and at the other side of the frame the ends of one spring of the pair being pivotally attached directly to the axles, with shackles connecting both ends of the other spring to the axles, respectively.

3. In a vehicle truck comprising a pair of axles, a vehicle frame, trunnion means on the frame intermediate said axles, and a pair of springs at each side of the frame mounted one above the other on said trunnion means for oscillation together thereon, the ends of both springs at one side of said frame being pivotally attached directly to the axles, and at the other side of the frame each axle being engaged with an end of one of the springs by means affording capacity for relative play of the axle and spring in the direction of the length of the spring, the other spring ends at that side of the frame being pivotally attached directly to the axles, respectively.

4. In a vehicle truck comprising a pair of axles, a vehicle frame, trunnion means on the frame intermediate said axles, and a pair of springs at each side of the frame mounted one above the other on said trunnion means for oscillation together thereon, the ends of both springs at one side of said frame being pivotally attached directly to the axles, and at the other side of the frame a shackle connecting each axle with an end of one of the springs, the other spring ends at that side being pivotally attached to the axles, respectively.

5. In a vehicle truck comprising a pair of axles, a vehicle frame, trunnion means on the frame intermediate said axles, and a pair of springs at each side of the frame having their middle portions secured rigidly together, said springs being mounted one above the other on said trunnion means for oscillation together thereon, the ends of both springs at one side of said frame being pivotally attached directly to the axles, and at the other side of the frame the ends of one spring of the pair being pivotally attached directly to the axles, each axle having a bracket extending rigidly therefrom and the ends of the other spring being slidably engaged in said brackets, respectively.

6. In a vehicle truck comprising a pair of axles, a vehicle frame, trunnion means on the frame intermediate said axles, and a pair of springs at each side of the frame mounted one above the other on said trunnion means for oscillation together thereon, the ends of both springs at one side of said frame being pivotally attached directly to the axles, and at the other side of the frame each axle being pivotally connected directly with an end of one of the springs, the other spring ends at that side being slidably engaged with the axles, respectively, for relative movement of said parts in the direction of the length of the spring.

7. In a vehicle truck comprising a pair of axles, a vehicle frame, trunnion means on the frame intermediate said axles, and a pair of springs at each side of the frame mounted one above the other on said trunnion means for oscillation together thereon, the ends of both springs at one side of said frame being pivotally attached directly to the axles, and at the other side of the frame the ends of the lower spring being pivotally attached directly to the axles, the ends of the upper spring engaging said axles with capacity for play in the direction of the length of said spring.

8. In a vehicle truck comprising a pair of axles, a vehicle frame, trunnion means on the frame intermediate said axles, and a pair of springs at each side of the frame connected together at their middle portions and mounted one above the other on said trunnion means for oscillation together thereon, the ends of both springs at one side of said frame being pivotally attached directly to the axles, and at the other side of the frame the ends of the lower spring being pivotally attached directly to the axles, each axles having a bracket extending rigidly therefrom and the ends of the upper spring being slidably engaged in said brackets, respectively.

9. In a vehicle truck comprising a pair of axles, a vehicle frame, trunnion means on the frame intermediate said axles, and a pair of springs at each side of the frame mounted one above the other on said trunnion means for oscillation together thereon, the ends of both springs at one side of said frame being pivotally attached directly to the axles, and at the other side of the frame a shackle connecting each axle with one end of the upper spring, the ends of the lower spring at that side being pivotally attached directly to the axles, respectively.

EUGENE J. DONDLINGER.